United States Patent [19]

Yang et al.

[11] Patent Number: 4,975,519

[45] Date of Patent: Dec. 4, 1990

[54] NOVEL POLYACETAL TERPOLYMERS OF TRIOXANE AND ALPHA, ALPHA- AND ALPHA, BETA-ISOMERS OF GLYCEROL FORMAL AND FUNCTIONAL DERIVATIVES THEREOF

[75] Inventors: Nan L. Yang, Staten Island, N.Y.; Andrew Auerbach, Livingston, N.J.; Rose Pesce, College Point, N.Y.; Jerry A. Broussard; James L. Paul, both of Summit, N.J.

[73] Assignee: Hoechst Celanese Corporation, Somerville, N.J.

[21] Appl. No.: 350,781

[22] Filed: May 12, 1989

[51] Int. Cl.⁵ .............................................. C08G 2/10
[52] U.S. Cl. .................................. 528/230; 528/241; 528/245; 528/245.5; 528/247; 528/249; 528/250; 528/392; 525/64; 525/66; 525/154; 525/370; 525/398
[58] Field of Search ............ 528/230, 241, 245, 245.5, 528/247, 249, 250, 392; 525/64, 66, 154, 370, 398

[56] References Cited

U.S. PATENT DOCUMENTS

| 3,027,352 | 3/1962 | Walling et al. | 528/241 |
| 4,713,414 | 12/1987 | Kusumgar | 525/64 |
| 4,792,579 | 12/1988 | Satoh et al. | 524/145 |

FOREIGN PATENT DOCUMENTS 1512216 2/1967 France .

Primary Examiner—John Kight, III
Assistant Examiner—Sam A. Acquah
Attorney, Agent, or Firm—Nixon & Vanderhye

[57] ABSTRACT

Cationic polymerization of trioxane and a mixture of ester derivatives of $\alpha,\alpha$- and $\alpha,\beta$-isomers of glycerol formal yields acetal terpolymers having pendant functional groups (i.e., ester groups, or hydroxyl groups obtained by hydrolyzing ester groups, pendent from the polymer's backbone). The glycerol formal monomers employed in this invention may include functional groups selected from ester moieties which are protected from, and thus survive, the polymerization process with trioxane. These groups may then be present as functional reactive sites for the subsequent synthesis of block polymers and/or to chemically bind modifiers to the acetal terpolymer backbone, for example.

32 Claims, 1 Drawing Sheet

NOVEL POLYACETAL TERPOLYMERS OF TRIOXANE AND ALPHA, ALPHA- AND ALPHA, BETA-ISOMERS OF GLYCEROL FORMAL AND FUNCTIONAL DERIVATIVES THEREOF

FIELD OF INVENTION

This invention relates to acetal polymers which are structurally related to polyoxymethylene (i.e., polymers having recurring —$CH_2O$— units). More specifically, the invention relates to a novel class of acetal terpolymers formed by the polymerization of the trioxane and a mixture of the $\alpha,\alpha$- and $\alpha,\beta$-isomers of glycerol formal and their ester functionalized derivatives.

BACKGROUND AND SUMMARY OF THE INVENTION

Acetal polymers represent an important class of engineering resins due to numerous favorable physical properties. For this reason, acetal polymers have a wide range of commercial applications, for example, as parts for automobiles, as plumbing components and a variety of household and personal products.

It is oftentimes desireable to modify one or more of the inherently advantageous physical properties of acetal polymers so as to meet the needs of specific end-use applications. Normally, to achieve such modified properties, acetal polymers are blended with a variety of other resins and/or ingredients (e.g., impact modifying agents, flame retardants, light and heat stabilizers, fillers, and the like). Usually the blending of acetal polymers is not without its own problems due principally to the highly crystalline nature of acetal polymers which is evident in a low level of compatibility with other polymers.

Grafting of a different resin and/or a specific chemical moiety onto a polyacetal backbone would present an attractive alternative to blending so as to achieve a block copolymer having the desired modified physical and/or chemical properties. However, with acetal polymers, grafting is usually not possible due to the low level of polyacetal end group functionality—that is, since each acetal copolymer molecule carries a maximum of two functional groups, e.g., hydroxyl end groups.

According to the present invention, however, a novel class of polyacetal terpolymers is provided which retain the beneficial physical and chemical properties of conventional acetal polymers, while yet also providing greatly increased functionality. Therefore, the acetal terpolymers of this invention may be reacted with other resins and/or chemical moieties so as to, for example, permit a variety of acetal polymers to be synthesized having chemically bound (i.e., not merely blended) modifying agents.

Broadly, the terpolymers of the present invention are obtained by the cationic copolymerization of trioxane with a mixture of $\alpha,\alpha$- and $\alpha,\beta$-isomers of glycerol formal or their ester functionalized derivatives. The resulting terpolymer will therefore exhibit side chain funtionality (i.e., in the form of pendant hydroxyl or ester functional groups) so as to enable synthesis of, for example, block polymers comprised of the acetal terpolymer of this invention and other specific polymers to achieve desired chemical and/or physical properties.

These, as well as other aspects and advantages of the present invention will become more clear after careful consideration is given to the following detailed description of the preferred exemplary embodiments.

BRIEF DESCRIPTION OF THE ACCOMPANYING DRAWINGS

FIG. 1 is a thermogravimetric analysis (TGA) plot of a trioxane-glycerol formal terpolymer of this invention in comparison to a conventional trioxane-ethylene oxide copolymer.

DETAILED DESCRIPTION OF THE PREFERRED EXEMPLARY EMBODIMENTS

Figure 1:
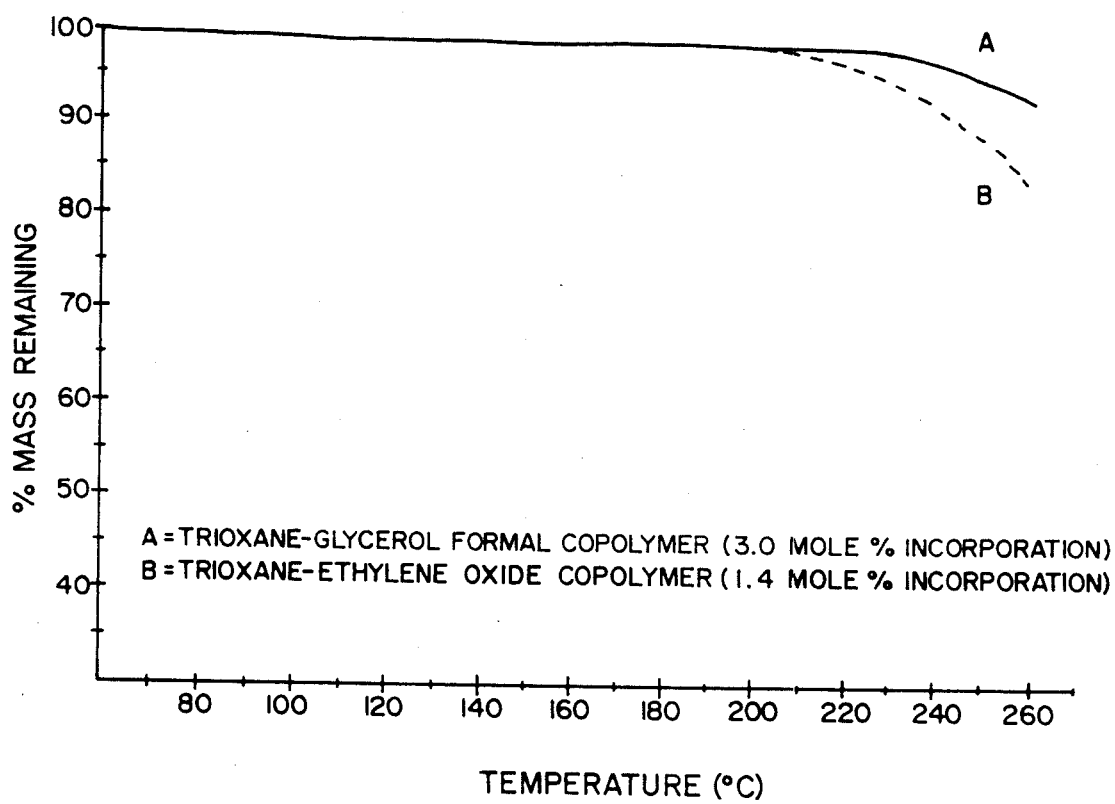

The glycerol formal derivatives useful as a comonomer in the cationic copolymerization with trioxane according to the present invention are preferably a substantially equal molar mixture of the $\alpha,\alpha$- and $\alpha,\beta$-isomers of glycerol formal of the general Formulas I and II, respectively:

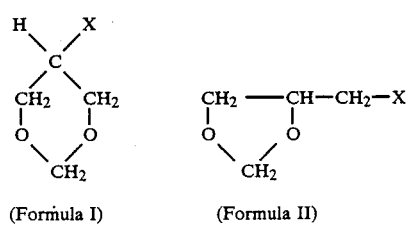

(Formula I)    (Formula II)

where X is a hydroxyl radical, or an ester radical Suitable ester radicals include, for example, saturated aliphatic esters, unsaturated aliphatic esters, substituted saturated aliphatic esters, and aromatic esters (e.g., benzoic acid). Thus, for example, X may be represented by the formulas —OH;

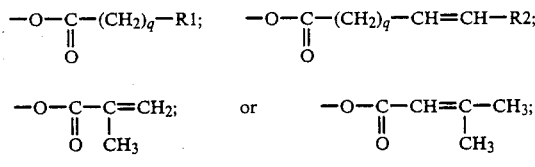

where each q is an integer zero to 8, R1 is a methyl or phenyl radical, and R2 is hydrogen or a methyl or phenyl radical.

Alternatively, X may be represented by halogen substituted esters of the above formulas, for example, halogen substituted alkanoic acids (e.g., 2-chloro-ethanoic acid or 3-chloro-propanoic acid).

The resulting terpolymer will have oxymethylene units (—$CH_2O$) interspersed with units derived from $\alpha,\beta$-isomers of glycerol formal or functionalized derivatives thereof. The functionalized moieties (i.e., hydroxyl or ester groups) will thus be present in the terpolymer as pendant groups along the terpolymer's backbone as represented by the structural Formula III:

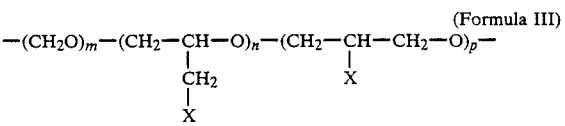

(Formula III)

where the pendant functional group X is as defined above, and m, n and p are each integers such that $m+n+p$ is between 5 to 20000, and the mole ratio of units of subscript n plus the units of subscript p to the units of subscript m is between about 1:5000 to 1:1, and preferably less than about 1:20.

The ester group of the glycerol formal derivatives employed as comonomers according to this invention are much less reactive (essentially nonreactive) during polymerization as compared to the formal group itself or the trioxane. As a result, the terpolymers according to this invention are essentially linear with side chain functionality of $CH_2X$ or X, when X in the glycerol formal derivative is an ester group. The pendant funtional group X may then be employed to react with other moieties to form, for example, a graft polymer having a backbone of the Formula III but with side chain groups of a desired chemical moiety replacing the functionalized group X.

Alternatively, the ester functional group can by hydrolyzed after polymerization to yield a pendant hydroxyl functional group for use in subsequent grafting onto the polyacetal backbone. Hydrolysis, in addition to converting pendant ester groups to hydroxyl groups also effects removal of unstable hemiacetal end groups and improves stability of the resulting polyacetal terpolymers of this invention.

The molecular weights of the acetal terpolymers according to this invention are greater than about 1500, for example, up to about 500,000 (preferably up to about 250,000). The higher molecular weight terpolymers are particularly preferred since lower molecular weight terpolymers could then be obtained by including well known chain transfer agents (e.g., dimethoxymethane) to reduce the molecular weights to those that may be desired for any given end use application.

The acetal terpolymers of this invention will exhibit thermal stability in excess of about 200° C. as determined by thermogravimetric analysis (TGA) and will have a high degree of crystallinity (e.g., greater than about 40%). For example, with glycerol formal comonomer incorporation of about 3 mole percent, crystallinity of about 68% has been observed.

Accompanying FIG. 1 shows a TGA plot (heating rate=10° C./min. under an inert atmosphere) of an acetal terpolymer according to this invention (i.e., obtained by the cationic solution copolymerization of trioxane and mixed isomers of glcerol formal with 3 mole percent incorporation of glycerol formal-derived units) in comparison to a conventional polyoxymethylene/polyoxyethylene copolymer (i.e., obtained by copolymerizing trioxane and ethylene oxide, with 1.4 mole percent incorporation of ethylene oxide-derived units). As is seen, the terpolymers of this invention exhibit thermal stability characteristics comparable (if not exceeding) those of the conventional polyoxymethylene/polyoxyethylene acetal copolymer.

The preferred catalysts used in the preparation of the terpolymers of the present invention are boron trifluoride or its coordination complexes with organic compounds in which oxygen or sulfur is the donor atom. The coordination complexes of boron trifluoride may, for example, be a complex with a phenol, an ether, an ester, or a dialkyl sulfide. Boron trifluoride etherate ($BF_3 \cdot Et_2O$) is the preferred coordination complex used in the cationic copolymerization processes of the present invention. Alternately, gaseous $BF_3$ may be employed as the polymerization initiator. In general, the initiator should be present in the polymerization zone in amounts such that its boron trifluoride content is between about 1 to 10000 ppm, preferably 10 to 1000 ppm, and more preferably 50 to 200 ppm.

The monomers in the reaction zone are preferably anhydrous or substantially anyhdrous. Small amounts of moisture, such as may be present in commercial grade reactants or may be introduced by contact with atmospheric air will not prevent polymerization, but should essentially be removed for best yields and to maximize molecular weights of the resulting terpolymers.

Monomers other than trioxane and mixed isomers of glycerol formal or its functionalized derivatives may also be employed in the practice of this invention so as to from tetrapolymers, for example —that is, a polymer having units in the chain derived from trioxane, each of the $\alpha,\alpha$- and $\alpha,\beta$-isomers of glycerol formal (or their ester functional derivatives), and the other monomer(s) which may be employed. In general, these additional monomers that may be employed are cyclic ethers and cyclic acetals, with ethylene oxide, 1,3-dioxolane, 1,3-dioxepane, 1,3-dioxep-5-ene, and 1,3,5-trioxepane being particularly preferred.

As used herein and in the accompanying claims, the term "terpolymer" is intended to encompass any polymer having, as at least part of the polymer chain, structural units derived from trioxane and each of the $\alpha,\alpha$- and $\alpha,\beta$-isomers of glycerol formal (or their ester functional derivatives). Thus, the term "terpolymer" as used herein and in the accompanying claims is intended to encompass tetrapolymers and the like which include structural units in the polymer chain derived from trioxane and each of the $\alpha,\alpha$- and $\alpha,\beta$-isomers of glycerol formal (or their ester functional derivatives), in addition to other units derived from, e.g., the cyclic ether or cyclic acetal monomers described above, if present during polymerization.

The acetal terpolymers of this invention may be formed by either bulk or solution polymerization processes. In the solution polymerization process, for example, the trioxane, glycerol formals (or their ester derivatives), and catalyst are dissolved in a common anhydrous solvent, such as cyclohexane, and permitted to react in a sealed reaction zone. The temperature in the reaction zone may vary from about 0° C. to about 100° C. When employing bulk copolymerization techniques, the temperature in the reaction zone may be greater than about 65° C. but less than 100° to 110° C. The period of reaction may vary from about a few minutes to about 72 hours or more. Pressures from sub-atmospheric to about 100 atmospheres, or more may be used, although pressures between about 1 to 10 atmospheres are presently preferred.

The ratio of trioxane to glycerol formal comonomer in the reaction mixture may roughly be predetermined for a desired mole ratio of glycerol formal-derived units in the resulting terpolymer. The particular incorporation levels of the glycerol formal-derived units in the resulting terpolymers will depend upon a number of factors, for example, the reaction time, temperature, amount of catalyst employed, the amount and type of glycerol formal derivative present in the reaction zone and the like.

During polymerization, some of the trioxane will react to form a homopolymer. In addition, unstable end groups formed in the copolymerization and unreacted monomer may be present after the reaction has proceeded for a sufficient time period. The trioxane homopolymer, the unstable end groups and/or any unreacted monomer may be removed by base hydrolysis so as to generate stable structures of the acetal terpolymers of this invention. Generally, this base hydrolysis involves dissolving the crude terpolymer in a suitable solvent containing an organic amine, and maintaining the solution at elevated temperatures sufficient to remove hemiacetal end groups and/or saponify ester groups. The hydrolysis, however, should be such that the acrylate groups in the side chains will undergo minimum saponification (i.e., when the glycerol formal comonomer is an acrylate or substituted derivative). The polymer may then be cooled to precipitate out the solid material.

The present invention is further illustrated by way of the following non-limiting examples.

EXAMPLES

The terpolymers formed according to the following Examples were characterized both qualitatively and quantitatively by NMR spectroscopy using an IBM WP-200 SY FT NMR spectrometer operating at 200 MHz for protons at a temperature of 120° C., and DMSO-d6 as solvent with tetramethylsilane as an internal standard.

EXAMPLE I

The following describe the synthesis of mixed $\alpha,\alpha$- and $\alpha,\beta$-isomers of glycerol formal ester functional derivatives.

A. Synthesis of Glycerol Formal Acetate

Glycerol formal (0.2 mol, 20.8 g), acetic anhydride (0.4 mol, 40 ml), and tripropylamine (2.9 g) were placed in a 100 ml flask fitted with a condenser and a drying tube. The reaction mixture was stirred at 115-120° C. for 18 hours. Acetic acid, acetic anhydride, and tripropylamine were first removed stepwise by distillation under moderate vacuum (70°-100° C./110 mm, 30 ml and then 67°-84° C./11-12mm, 2 ml). The remaining desired product was distilled and collected under high vacuum (b.p. 72°-76° C./5-6mm). The yield of the resulting product was 63% (18.3 g). $^1$H NMR spectrum confirmed that the resulting product was a mixture of 4-hydroxymethyl dioxolane acetate (46%) and 5-hydroxy-1,3-dioxane acetate (54%).

B. Synthesis of Glycerol Formal Methacrylate

Glycerol formal (0.2 mol, 20.B g), methacrylic anydride (0.21 mol, 32.3 g), hydroquinone (0.04 g) and tributyl amine (1.8 g) were placed in a 100 ml flask fitted with a condenser and a drying tube. The reaction mixture was stirred at 105° C. for 15 hours. The reaction mixture was then neutralized while stirring with 20% aqueous sodium carbonate. The organic layer was separated from the aqueous layer in a separatory funnel. The crude product in the organic layer was washed twice with water (2×30 ml) and collected. The product was distilled and collected under vacuum (b.p. 92°-96° C./8-9mm; yield 59%, 20.2 g). $^1$H NMR spectrum confirmed that the resulting product was a mixture of 4-hydroxymethyl dioxolane methacrylate (51%) and 5-hydroxy-1,3-dioxane methacrylate (49%).

C. Synthesis of Glycerol Formal Crotonate

Glycerol formal (0.2 mol, 20.8 g), crotonic anhydride (0.202 mol, 31.2 g), hydroquinone (0.04 g) and tributyl amine (3.7 g) were placed in a 100 ml flask with a condenser. The reaction mixture was stirred at 110° C. for 7 hours. The reaction mixture was then neutralized while stirring with 5% sodium carbonate-water. The organic layer was separated from the aqueous layer in a separatory funnel. The crude product was washed twice with water (2×30 ml) and separated. The product was distilled and collected under vacuum (b.p. 96°-102° C./4-5 mm; yield 47%, 16.0 g). $^1$H NMR spectrum confirmed that the resulting product was a mixture of 4-hydroxymethyl dioxolane crotonate (54%) and 5-hydroxy-1,3-dioxane crotonate (46%).

D. Synthesis of Glycerol Formal Chloroacetate

Glycerol formal (0.2 mol, 20.8 g), chloroacetic acid (0.22 mol, 20.8 g) and toluene (30 ml) were placed in a 100 ml flask with a Dean-Stark Trap and a condenser. The reaction mixture was stirred at 160°-175° C. for 4 hours and water (3.1 ml)-toluene was collected. After removing the toluene, the product was distilled and collected under vacuum (b.p. 95°-100° C./5-6 mm; yield 67%, 24.0 g). $^1$H NMR spectrum confirmed that the resulting product was a substantially equimolar mixture of 4-hydroxymethyl dioxolane chloroacetate and 5-hydroxy-1,3-dioxane chloroacetate.

EXAMPLE II

A. Purification of Trioxane

The trioxane used was distilled at 114° C. from sodium metal to remove water with benzophenone as indicator, under the protection of dry nitrogen. Two hundred grams of trioxane (Aldrich Co.) were placed in a 500 ml round bottom flask equipped with a magnetic stirrer. The system was heated to about 80° C., then 0.5 gram of sodium metal and 0.3 gram of benzophenone was added under stirring. When water was removed by sodium, the color of solution changed from light yellow to brown, then to blue. After the appearance of the blue color, the temperature was raised to about 114° C. for distillation. Early portions of the distillate were discarded. The collected later portions had a water content of about 40-70 ppm.

B. POLYMERIZATION

Polymerization of trioxane (TOX) with the glycerol formal derivatives obtained in EXAMPLE I above, and glycerol formal (a substantially equimolar mixture of $\alpha$, $\alpha$ and $\alpha$, $\beta$-isomers of glycerol formal obtained from Aldrich Chemical Co. —i.e., a mixture of glycerol formal isomers of Formula I and Formula II where X is a hydroxy radical) was carried out using the reaction conditions and charges as identified in Table 1, below.

A dry test tube (25×150 mm) was charged with trioxane and the glycerol formal derivative identified in Table 1, capped with a serum stopper and then purged with nitrogen and evacuated. The contents of the tube were brought to the desired temperature, and the required amount of boron trifluoride etherate was injected through the serum stopper into the completely melted mixture. The polymerization was allowed to proceed at the temperature and for the time indicated in Table 2. At the conclusion of the polymerization, the polymer was removed and pulverized in a Waring blender. The crude polymer was then stirred in 60 ml of methanol containing 1% triethanolamine (TEOA) for one hour and then collected by filtration.

Unstable end groups were removed by base hydrolysis according to the following procedure. The crude polymer (15 g), dimethylformamide (120 ml), benzyl alcohol (120 ml) and TEOA (1% of total volume) were placed in a 500 ml, two-necked round bottom flask fitted with a thermometer and an air-cooled, straight-through condenser. The mixture was heated and stirred at 160°-170° C. to dissolve the solid polymer. The contents were maintained at refluxing conditions until evolution of formaldehyde was no longer visible. The polymer solution was cooled to room temperature and the solid polymer was removed and washed three times with acetone. The polymer was then filtered and dried under vacuum at 40° C.

Table 1 identifies the glycerol formal derivatives prepared in accordance with this Example II (i.e., a mixture of glycerol formals of Formulas I and II above, where X is as identified in Table 1), while Table 2 below shows the reaction conditions used and the results.

TABLE 1

| Sample No. | Glycerol Formula (X = ) |
|---|---|
| 1-1 | —OH |
| 1-2 | $-O-\underset{\parallel}{\underset{O}{C}}-CH_3$ |
| 1-3 | |
| 1-4 | $-O-\underset{\parallel}{\underset{O}{C}}-\underset{\mid}{\underset{CH_3}{C}}=CH_2$ |
| 1-5 | |
| 1-6 | |
| 1-7 | $-O-\underset{\parallel}{\underset{O}{C}}-CH=CH-CH_3$ |
| 1-8 | |
| 1-9 | |
| 1-10 | $-O-\underset{\parallel}{\underset{O}{C}}-CH_2-Cl$ |

EXAMPLE III

Trioxane and glycerol formal acetate (i.e., a substantially equimolar quantity of the glycerol formal isomers identified by Formulas I and II, above, wherein each X is acetate; hereinafter referenced as "MGFA") were polymerized according to the conditions identified in Tables 3 and 4 below. 45 cc of trioxane and MGFA in the amounts identified in Table 3 were added to an appropriate reaction vessel heated to about 80° C. Thereafter $BF_3 \, Et_2O$ as initiator was added and the time between initiator addition and the appearance of an exotherm (e.g., an increase in the reaction mixture temperature of at least about 5° C.) was recorded as the induction time. The reaction was allowed to continue for at least 20 minutes and thereafter allowed to cool to room temperature for about 40 minutes. The resulting terpolymer was recovered and broken into small particles. The particles were then soaked in aqueous 0.5 wt% triethylamine (TEA) solution so as to neutralize the initiator. The terpolymer was then subjected to hydrolysis by adding, in an autoclave, 25.0 grams of the crude terpolymer to 160 ml of a TEA solution comprised of 1% TEA, 34% methanol and 65% water. The terpolymer and TEA solution was heated to between 180° C. to 190° C. under pressure and maintained at that

TABLE 2

| SAMPLE NO. | TOX (g) | GF (g) | INITIATOR (ul) | SOLV.* (ml) | REACTION CONDITIONS (°c/h) | GF IN FEED (Mole %) | % YIELD After Hydr. | COMONOMER INCORP. (Mole %) |
|---|---|---|---|---|---|---|---|---|
| 1-1 | 18 | 2 | 120 | — | 65/15 | 8.70 | 40 | 7.3** |
| 1-2 | 18 | 2 | 10 | 20 | 58/15 | 6.40 | 71 | 2.7 |
| 1-3 | 18 | 2 | 5 | 20 | 63/15 | 6.40 | 66 | 4.0 |
| 1-4 | 18 | 2 | 30 | 20 | 65/15 | 5.48 | 43 | 3.0 |
| 1-5 | 18 | 2 | 35 | 20 | 70/15 | 5.48 | 53 | 2.8 |
| 1-6 | 8 | 2 | 65 | 20 | 65/15 | 11.50 | 58 | 4.9 |
| 1-7 | 18 | 2 | 50 | 20 | 68/15 | 5.48 | 48 | 2.0 |
| 1-8 | 18 | 2 | 35 | 20 | 70/15 | 5.48 | 49 | 2.6 |
| 1-9 | 8 | 2 | 50 | 20 | 70/16 | 11.50 | 44 | 11.5 |
| 1-10 | 8 | 2 | 30 | — | 70/10 | 11.10 | 38 | 5.9 |

*Cyclohexane
**Based on Total Integrated Area of Absorption Peaks in NMR Spectrum Due to All Protons of the Comonomer temperature for about 30 minutes. After cooling, the hydrolyzed terpolymer was washed, filtered and dried in a recrystallizing dish.

TABLE 3

| SAMPLE NO. | MGFA FEED | | | TRIOXANE FEED | | | INITIATOR FEED (PPM $BF_3$) | TOTAL CHARGE (g) |
|---|---|---|---|---|---|---|---|---|
| | Vol. (cc) | Wt. % | Mole % | Vol. (cc) | Wt. % | Mole % | | |
| 4-1 | 1.40 | 3.12 | 0.66 | 45.00 | 96.88 | 99.34 | 51 | 54.34 |
| 4-2 | 2.80 | 6.05 | 1.30 | 45.00 | 93.95 | 98.70 | 49 | 56.04 |
| 4-3 | 1.40 | 3.12 | 0.66 | 45.00 | 96.88 | 99.34 | 51 | 54.34 |
| 4-4 | 1.40 | 3.12 | 0.66 | 45.00 | 96.88 | 99.34 | 102 | 54.34 |
| 4-5 | 2.80 | 6.05 | 1.30 | 45.00 | 93.95 | 98.70 | 49 | 56.04 |
| 4-6 | 2.80 | 6.05 | 1.30 | 45.00 | 93.95 | 98.70 | 49 | 56.04 |
| 4-7* | 1.40 | 3.09 | 0.65 | 45.00 | 95.95 | 98.94 | 50 | 54.87 |
| 4-8* | 1.40 | 3.09 | 0.65 | 45.00 | 95.95 | 98.94 | 101 | 54.87 |
| 4-9 | 2.80 | 6.05 | 1.30 | 45.00 | 93.95 | 98.70 | 197 | 56.04 |
| 4-10 | 2.80 | 6.05 | 1.30 | 45.00 | 93.95 | 98.70 | 99 | 56.04 |
| 4-11 | 5.00 | 10.31 | 2.31 | 45.00 | 89.69 | 97.69 | 188 | 58.70 |
| 4-12 | 10.00 | 18.69 | 4.51 | 45.00 | 81.31 | 95.49 | 256 | 64.75 |
| 4-13 | 15.00 | 25.64 | 6.61 | 45.00 | 74.36 | 93.39 | 312 | 70.80 |
| 4-14 | 1.40 | 3.12 | 0.66 | 45.00 | 96.88 | 99.34 | 51 | 54.34 |
| 4-15 | 2.80 | 6.05 | 1.30 | 45.00 | 93.95 | 98.70 | 49 | 56.04 |
| 4-16 | 1.40 | 3.12 | 0.66 | 45.00 | 96.88 | 99.34 | 102 | 54.34 |
| 4-17 | 2.80 | 6.05 | 1.30 | 45.00 | 93.95 | 98.70 | 99 | 56.04 |
| 4-18 | 5.00 | 10.31 | 2.31 | 45.00 | 89.69 | 97.69 | 188 | 58.70 |
| 4-19 | 10.00 | 18.69 | 4.51 | 45.00 | 81.31 | 95.49 | 256 | 64.75 |
| 4-20 | 15.00 | 25.64 | 6.61 | 45.00 | 74.36 | 93.39 | 312 | 70.80 |

*Also containing dioxolane in the amount of 0.97 wt. %/0.4 mole %/0.50 cc

TABLE 4

| SAMPLE NO. | REACTION TIME (MIN.) | HYDROLYSIS TIME (MIN.) | WEIGHT AFTER HYDROLYSIS (g) | % OVERALL YIELD | MOLECULAR WT. (Approx.) |
|---|---|---|---|---|---|
| 4-1 | 60-120 | 40 | 24.86 | 46.75 | 77,700 |
| 4-2 | 60-120 | 40 | 20.05 | 36.01 | 64,400 |
| 4-3 | 20 | 30 | 18.16 | 51.52 | 115,600 |
| 4-4 | 20 | 30 | 18.90 | 67.14 | 108,350 |
| 4-5 | 20 | 30 | 18.59 | 38.68 | 67,000 |
| 4-6 | 20 | 30 | 19.50 | 65.07 | 72,150 |
| 4-7 | 20 | 30 | 15.55 | 34.01 | 225,000 |
| 4-8 | 20 | 30 | 21.36 | 62.06 | ND* |
| 4-9 | 20 | 30 | 14.07 | 47.75 | " |
| 4-10 | 120 | 30 | 4.77 | 14.36 | " |
| 4-11 | 20 | N/A** | N/A | ND | " |
| 4-12 | 60 | " | " | " | " |
| 4-13 | 60 | " | " | " | " |
| 4-14 | 20 | 30 | 9.73 | 38.76 | " |
| 4-15 | 20 | 30 | 14.60 | 53.40 | " |
| 4-16 | 20 | 30 | 9.73 | 32.28 | " |
| 4-17 | 20 | 30 | 8.54 | 29.78 | " |
| 4-18 | 20 | 30 | 13.80 | 40.63 | " |
| 4-19 | 20 | 30 | 17.30 | 51.19 | " |
| 4-20 | 20 | 30 | 15.40 | 47.51 | " |

ND = not determined
**N/A = not applicable

As is evident from the above Examples, the present invention achieves novel acetal terpolymers via the cationic polymerization of trioxane and the $\alpha,\alpha$- and $\alpha,\beta$- isomers of glycerol formal or their ester derivatives. The acetal terpolymers will, moreover, have pendant $CH_2X$ or $X$ groups, where $X$ is either a hydroxyl or an ester moiety as defined above, which survive the polymerization process. These functional moieties will therefore provide a reactive site for the subsequent synthesis of block copolymers and/or to chemically bind modifiers to the acetal terpolymer backbone, for example.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An essentially linear acetal terpolymer of the formula:

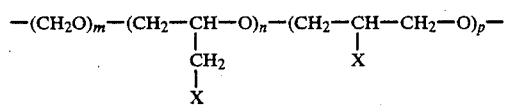

where X is an ester radial or a hydroxyl radical obtained by hydrolyzing an ester radical, and m, n and p are each integers such that m+n+p is between 5 to 20000, and the mole ratio of units of subscript n plus the units of subscript p to the units of subscript m is between about 1:5000 to 1:1, and wherein said acetal terpolymer is the reaction product of trioxane and a mixture of ester derivatives of $\alpha, \alpha$- and $\alpha,\beta$-isomers of glycerol formal.

2. An essentially linear acetal terpolymer comprising the reaction product of trioxane and a mixture of ester derivatives of $\alpha,\alpha$- and $\alpha,\beta$-isomers of glycerol formal, said terpolymer having a ratio of units derived from the ester derivatives of the $\alpha,\alpha$- and $\alpha,\beta$-isomers of glycerol formal to oxymethylene units derived from trioxane of between 1:5000 to 1:1, and having a molecular weight of up to about 500,000, thermal stablity in excess of 200° C., and greater than about 40% crystallinity.

3. An acetal terpolymer as in claim 2, wherein the ester derivatives of the $\alpha,\alpha$- and $\alpha,\beta$-isomers of glycerol formal are of the general Formulas I and II, respectively:

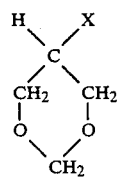 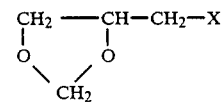

(Formula I)   (Formula II)

where X is an ester radial.

4. An acetal terpolymer as in claim 3, wherein X is represented by the formulas:

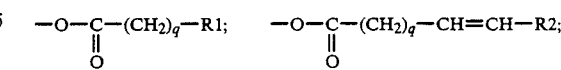

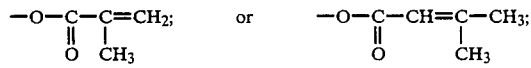

where each q is an integer from zero to 8, R1 is a methyl or phenyl radical, and R2 is hydrogen or a methyl or phenyl radical.

5. An acetal terpolymer as in claim 3, wherein X is a radical selected from acetate, acrylate, methacrylate, crotonate, and chloroacetate.

6. An acetal terpolymer as in claim 3, wherein X is a halogen substituted ester.

7. An acetal terpolymer as in claim 6, wherein said halogen substituted ester is a halogen substituted alkanoic acid.

8. An acetal terpolymer as in claim 7, wherein said halogen substituted ester is 2-chloro-ethanoic acid or 3-chloro-propanoic acid.

9. An acetal terpolymer as in claim 2, further comprising units in the polymer chain derived from a cyclic ether or cyclic acetal comonomer.

10. An acetal terpolymer as in claim 9, wherein said cyclic ether or cyclic acetal comonomer is at least one selected from ethylene oxide, 1,3-dioxolane, 1,3-dioxepane, 1,3-dioxep-5-ene, and 1,3,5-trioxepane.

11. A method of making an essentially linear terpolymer acetal which comprises the cationic polymerization of trioxane with a mixture of ester deriviatives of $\alpha,\alpha$- and $\alpha,\beta$-isomers of glycerol formal.

12. A method as in claim 11, wherein the ester derivatives of the $\alpha,\alpha$- and $\alpha,\beta$-isomers of glycerol formal are of the general Formulas I and II, respectively:

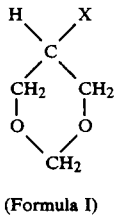 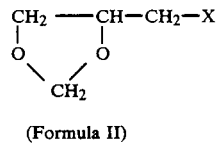

(Formula I)　　　(Formula II)

where X is an ester radical.

13. A method as in claim 12, wherein X is represented by the formulas:

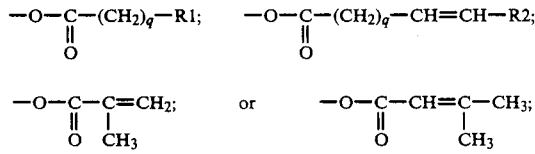

where each q is an integer from zero to 8, R1 is a methyl or phenyl radical, and R2 is hydrogen or a methyl or phenyl radical.

14. A method as in claim 12, wherein X is a radical selected from acetate, acrylate, methacrylate, crotonate, and chloroacetate.

15. A method as in claim 12, wherein X is a halogen substituted ester.

16. A method as in claim 15, wherein said halogen substituted ester is a halogen substituted alkanoic acid.

17. A method as in claim 16, wherein said halogen substituted ester is 2-chloro-ethanoic acid or 3-chloro-propanoic acid.

18. A method as in claim 11, wherein said polymerization is initiated with boron trifluoride or a coordination complex of boron trifluoride.

19. A method as in claim 18, wherein said coordination complex of boron fluoride is boron trifluoride etherate.

20. A method of making an essentially linear acetal terpolymer of the formula:

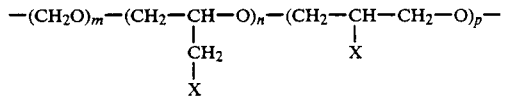

where X is an ester radical or a hydroxyl radical obtained by hydrolyzing an ester radical, and wherein m, n and p are each integers such that m+m+p is between 5 to 20000, and the mole ratio of units of subscript n plus the units of subscript p to the units of subscript m is between about 1:5000 to 1:1, which method comprises the cationic polymerization of trioxane with a mixture of the ester derivatives of $\alpha,\alpha$- and $\alpha,\beta$-isomers of glycerol formal.

21. A method as in claim 20, wherein the ester derivatives of the $\alpha,\alpha$- and $\alpha,\beta$-isomers of glycerol formal are of the general Formulas I and II, respectively:

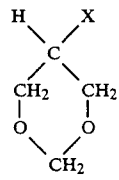 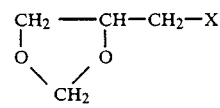

(Formula I)　　　(Formula II)

where X is a hydroxyl radical, or an ester radical.

22. A method as in claim 21, wherein X is represented by the formulas:

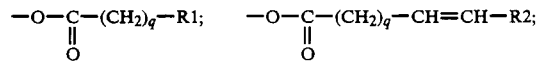
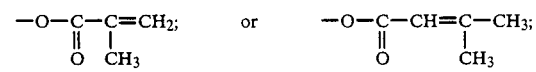

where each q is an integer from zero to 8, R1 is a methyl or phenyl radical, and R2 is hydrogen or a methyl or phenyl radical.

23. A method as in claim 21, wherein X is a radical selected from acetate, acrylate, methacrylate, crotonate, and chloroacetate.

24. A method as in claim 21, wherein X is a halogen substituted ester.

25. A method as in claim 24, wherein said halogen substituted ester is a halogen substituted alkanoic acid.

26. A method as in claim 25, wherein said halogen substituted ester is 2-chloro-ethanoic acid or 3-chloro-propanoic acid.

27. A method as in claim 20, wherein said polymerization is initiated with boron trifluoride or a coordination complex of boron trifluoride.

28. A method as in claim 27, wherein said coordination complex of boron trifluoride is boron trifluoride etherate.

29. A method as in claim 11 or 20, which further comprises polymerizing trioxane and a mixture of ester derivatives of $\alpha,\alpha$- and $\alpha,\beta$-isomers of glycerol formal, in the presence of an additional comonomer selected from cyclic ethers and cyclic acetals.

30. A method as in claim 29, wherein said additional comonomer is at least one selected from ethylene oxide, 1,3-dioxolane, 1,3-dioxepane, 1,3-dioxep-5-ene, and 1,3,5-trioxepane.

31. An acetal terpolymer as in claim 2, which comprises pendant hydroxyl radicals obtained by hydrolyzing pendant ester radicals of said ester derivatives of said $\alpha,\alpha$- or $\alpha,\beta$-isomers of glycerol formal.

32. A method as in claim 12, further comprising subjecting the terpolymer to hydrolysis conditions sufficient to hydrolyze the pendant ester groups thereof derived from said ester radicals of Formulas I and II to obtain pendant hydroxyl groups.

* * * * *

UNITED STATES PATENT AND TRADEMARK OFFICE
CERTIFICATE OF CORRECTION

PATENT NO. : 4,975,519

DATED : December 4, 1990

INVENTOR(S) : Yang et al

It is certified that error appears in the above-identified patent and that said Letters Patent is hereby corrected as shown below:

Column 2, line 29, after "radical" insert a period (.);
line 52, change $(-CH_2O)$ to $--(-CH_2O-)--$.

Column 3, line 16, after "can" delete "by" and insert --be--.

Column 4, line 11, after "to" delete "from" and insert --form--.

Signed and Sealed this

Nineteenth Day of May, 1992

*Attest:*

DOUGLAS B. COMER

*Attesting Officer*       *Acting Commissioner of Patents and Trademarks*